US008842835B2

(12) United States Patent
Geyzel et al.

(10) Patent No.: US 8,842,835 B2
(45) Date of Patent: Sep. 23, 2014

(54) NETWORK SECURITY SYSTEM

(75) Inventors: Zeev Geyzel, Alon Shvut (IL); Leo Dorrendorf, Maale Adumim (IL)

(73) Assignee: Cisco Technology, San Jose, CA (US)

( * ) Notice: Subject to any disclaimer, the term of this patent is extended or adjusted under 35 U.S.C. 154(b) by 836 days.

(21) Appl. No.: 11/793,365

(22) PCT Filed: May 1, 2006

(86) PCT No.: PCT/IL2006/000519
§ 371 (c)(1),
(2), (4) Date: Oct. 1, 2008

(87) PCT Pub. No.: WO2007/049267
PCT Pub. Date: May 3, 2007

(65) Prior Publication Data
US 2009/0077379 A1 Mar. 19, 2009

(30) Foreign Application Priority Data
Oct. 27, 2005 (IL) .......................................... 171601

(51) Int. Cl.
*H04L 29/06* (2006.01)
(52) U.S. Cl.
USPC ....................................................... 380/277
(58) Field of Classification Search
USPC ....................................................... 380/277
See application file for complete search history.

(56) References Cited

U.S. PATENT DOCUMENTS

| | | |
|---|---|---|
| 5,764,767 A | 6/1998 | Beimel et al. |
| 6,367,019 B1 | 4/2002 | Ansell et al. |
| 6,408,392 B2 | 6/2002 | White |
| 6,748,084 B1 | 6/2004 | Gau et al. |
| 8,139,770 B2 * | 3/2012 | Zheng et al. .................. 380/286 |

(Continued)

FOREIGN PATENT DOCUMENTS

| | | |
|---|---|---|
| EP | 1 569 378 | 8/2005 |
| WO | 00/41357 A1 | 7/2000 |

(Continued)

OTHER PUBLICATIONS

Canetti, Ran, et al. "Universally composable two-party and multi-party secure computation." Proceedings of the thiry-fourth annual ACM symposium on Theory of computing. ACM, 2002.*

(Continued)

*Primary Examiner* — Harris Wang
(74) *Attorney, Agent, or Firm* — Ladas & Parry LLP

(57) ABSTRACT

A system for restricting access to encrypted content stored in a consuming device (12) which is part of a network (10) including other devices (14), the system including a content storage medium to store the encrypted content, a secret-share distribution module to distribute secret-shares to the other devices (14), a secret-share receive module to receive the secret-shares from the other devices (14), a secret reconstruction module to form a content decryption input from the secret-shares received by the secret-share receive module, a content decryption module to receive the encrypted content from the content storage medium and the content decryption input from the secret reconstruction module and decrypt the encrypted content using the content decryption input thereby rendering decrypted content, and a content consumer to use the decrypted content, wherein the secret shares distributed to the other devices (14) are in an encrypted format for decryption by the consuming device (12) or the other devices (14).

9 Claims, 10 Drawing Sheets

(56) References Cited

U.S. PATENT DOCUMENTS

| | | | |
|---|---|---|---|
| 2001/0037407 A1* | 11/2001 | Dragulev et al. | 709/250 |
| 2002/0108040 A1* | 8/2002 | Eskicioglu | 713/172 |
| 2002/0157002 A1 | 10/2002 | Messerges et al. | |
| 2003/0026432 A1 | 2/2003 | Woodward | |
| 2003/0081789 A1* | 5/2003 | Numao et al. | 380/278 |
| 2003/0088782 A1 | 5/2003 | Forrest | |
| 2003/0112969 A1 | 6/2003 | Algesheimer et al. | |
| 2003/0115251 A1* | 6/2003 | Fredrickson et al. | 709/201 |
| 2004/0103276 A1 | 5/2004 | Jing et al. | |
| 2004/0117649 A1* | 6/2004 | Whyte | 713/200 |

FOREIGN PATENT DOCUMENTS

| | | |
|---|---|---|
| WO | 00/58963 | 10/2000 |
| WO | 02/087145 A1 | 10/2002 |
| WO | 03/067809 | 8/2003 |
| WO | 2004/051920 | 6/2004 |

OTHER PUBLICATIONS

A Fast (2, $2^m$)-Threshold Secret Sharing Scheme Using m Linearly Independent Binary Vectors Suga, Y. Network-Based Information Systems (NBiS), 2013 16th International Conference on Digital Object Identifier: 10.1109/NBiS.2013.90 Publication Year: 2013, pp. 539-544.*

International Preliminary Report on Patentability in PCT/IL2006/000519 dated May 8, 2008.

English Abstract of WO 2004/051920 dated Jun. 17, 2004.

Search Report of Oct. 7, 2010 in respect of counterpart EP Application No. 06728315.0.

Official Communication of Mar. 4, 2011 in European Application 06 728 315.0.

* cited by examiner

NETWORK SECURITY SYSTEM

The present application is a 35 USC §371 application of PCT/IL06/000519, filed on 1 May 2006 and entitled "Network Security System", which was published on 3 May 2007 in the English language with International Publication Number WO 2007/049267, and which relies for priority on Israel Patent Application No. 171601, filed on 27 Oct. 2005.

FIELD OF THE INVENTION

The present invention relates to security of content stored in a consuming device which is part of a network including other devices.

BACKGROUND OF THE INVENTION

By way of introduction, personal video recorders (PVRs) typically record broadcast media content thereon. The media content is preferably stored in an encrypted format. Entitlement control messages (ECMs) (or similar decryption inputs), which are generally used to decrypt the content are also typically stored in the PVR. A security device, for example, but not limited to, a smart card is typically used to convert the ECMs into keys for decrypting the media content stored in the PVR. Therefore, if the PVR is stolen along with the accompanying smart card there is nothing stopping the thief from accessing the content stored in the PVR. Even if the PVR is stolen without the smart card, the thief may be able to hack the device thereby gaining access to the content, leading to unauthorized distribution and/or viewing.

Additionally, there is a problem of computer, storage device and/or file theft in a home and/or corporate environment.

The following references are believed to represent the state of the art:

U.S. Pat. No. 5,764,767 to Beimel, et al.;
U.S. Pat. No. 6,367,019 to Ansell, et al.;
U.S. Pat. No. 6,748,084 to Gau, et al.;
US Published Patent Application No. 2002/0157002 of Messerges, et al.;
US Published Patent Application No. 2003/0026432 of Woodward;
PCT Published Patent Application No. WO04/051920 of Matsushita Electric Industrial Co., Ltd.;
PCT Published Patent Application No. WO03/067809 of Surety, Inc.; and
PCT Published Patent Application No. WO00/058963 of Liquid Audio, Inc.

The disclosures of all references mentioned above and throughout the present specification, as well as the disclosures of all references mentioned in those references, are hereby incorporated herein by reference.

SUMMARY OF THE INVENTION

The present invention seeks to provide an improved system and method for restricting access to encrypted content stored in a consuming device which is part of a network including other devices.

The system of the present invention, in preferred embodiments thereof, makes content readable only when the content storage is on an authorized network. Content decryption input for decrypting the encrypted content is stored among the other devices (for example, but not limited to, security servers or other static devices) in the network in the form of secret shares. The term "content decryption input" as used in the specification and claims is defined as: (i) an input used directly to decrypt content, the input being for example, but not limited to, a decryption key; or (ii) an input used indirectly to decrypt content, the input being for example, but not limited to an entitlement control message, whereby the input is used to form a key for directly decrypting content. The secret shares are sent to the other devices while encrypted. In order to decrypt the encrypted content, the secret shares are recovered from the other devices and the content decryption input is formed from the secret shares. Therefore, if the device is removed from the authorized network prior to recovery of the secret shares then the content decryption input cannot be formed from the secret shares.

By way of example, in a Pay-TV environment, an attacker is forced to break multiple devices in order to get the ECMs. The ECMs are not placed on the same physical device as the media content, but instead preferably distributed among a number of devices within the network.

It is possible to create enough secret shares from each content decryption input for more than one authorized network, so that a device, for example, but not limited to, a portable computer can be moved from one authorized network to another (for example, from a corporate network to a home network) and access secured files in both authorized networks.

In accordance with a preferred embodiment of the present invention the consuming device preferably encrypts the secret shares prior to sending the secret shares to the other devices such that only the consuming device can decrypt the secret shares. In the preferred embodiment, the other devices are thereby prevented from reconstructing the content decryption input for use by the other devices.

In accordance with a first alternative preferred embodiment of the present invention, the consuming device is treated as a "non-trusted party". Devices are typically defined as "non-trusted" if they are not trusted to distribute the secret shares and/or delete the content decryption input after the secret shares have been formed. Therefore, in the "non-trusted party" mode, a content provider provides the content with already encrypted secret shares. In order for the consuming device to decrypt the secret shares, the secret shares need to be sent to the other devices for decryption first. When the consuming device wants to access the encrypted content, the other devices decrypt the encrypted secret shares. The other devices then send the decrypted secret shares to the consuming device. The consuming device then forms the content decryption input from the decrypted secret shares. In the first alternative preferred embodiment, the consuming device does not receive the content decryption input from the content provider and the consuming device is forced to distribute the secret shares to the other devices in the network.

In accordance with a second alternative preferred embodiment of the present invention, the secret shares are doubly encrypted by the content provider so that the secret shares first need to be decrypted by the other devices and then decrypted by the consuming device.

In the above embodiments, the formation of the content decryption input from the secret shares does not typically require all the distributed secret shares to be used, but only a fraction thereof. This is typically performed using a secret sharing threshold scheme, for example, but not limited to, the Shamir Secret Sharing Scheme, published in 1979.

The system and method of the present invention, in preferred embodiments thereof, is useful for a variety of content for example, but not limited to, media content, data and files.

There is thus provided in accordance with a preferred embodiment of the present invention a system for restricting access to encrypted content stored in a consuming device which is part of a network including other devices, the system including a plurality of operationally connected elements including a content storage medium to store the encrypted content therein, a decryption input disseminator including a secret share distribution module to distribute a plurality of secret shares to the other devices, a decryption input accumulator including a secret share receive module to receive at least some of the secret shares from the other devices, and a secret reconstruction module to form a content decryption input from the at least some secret shares received by the secret share receive module, a content decryption module to receive the encrypted content from the content storage medium and the content decryption input from the secret reconstruction module, and decrypt the encrypted content using the content decryption input thereby rendering decrypted content, and a content consumer to use the decrypted content decrypted by the content decryption module, wherein the secret shares distributed to the other devices are in an encrypted format for at least one of decryption by the consuming device and the other devices.

Further in accordance with a preferred embodiment of the present invention the elements also include a content and secret receive module to receive the encrypted content and the content decryption input for forwarding to the content storage medium and the decryption input disseminator, respectively, the decryption input disseminator also includes a secret share splitting module to split the content decryption input into the secret shares, and erase the content decryption input from the consuming device, and a secret share encryption module to encrypt the secret shares created by the secret share splitting module, and the decryption input accumulator also includes a secret share decryption module to decrypt the at least some secret shares received by the secret share receive module, and forward the decrypted secret shares to the secret reconstruction module.

Still further in accordance with a preferred embodiment of the present invention the secret shares are encrypted by the secret share encryption module only for decryption by the consuming device.

Additionally in accordance with a preferred embodiment of the present invention the secret share splitting module is operative to split the content decryption input into the secret shares in accordance with a threshold scheme such that the secret reconstruction module only needs a predetermined number of any of the secret shares in order to form the content decryption input, the predetermined number being greater than one but less thank the number of the other devices.

Moreover in accordance with a preferred embodiment of the present invention the threshold scheme is based on the Shamir secret-sharing method.

Further in accordance with a preferred embodiment of the present invention the elements also include a content and secret receive module to receive the encrypted content and the secret shares, the secret shares being received encrypted such that each of the secret shares is uniquely encrypted for decryption by a corresponding one of the other devices, and forward the encrypted content to the content storage medium and the encrypted secret shares to the secret share distribution module.

Still further in accordance with a preferred embodiment of the present invention the elements also include a content and secret receive module to receive the encrypted content and the secret shares, the secret shares being received doubly encrypted by an inner encryption and then an outer encryption such that the outer encryption needs to be decrypted before the inner encryption, the outer encryption being uniquely encrypted for decryption by a corresponding one of the other devices, the inner encryption being for decryption only by the consuming device, and forward the encrypted content to the content storage medium and the encrypted secret shares to the secret share distribution module, and the decryption input accumulator also includes a secret share decryption module to decrypt the at least some secret shares received by the secret share receive module, and forward the decrypted secret shares to the secret reconstruction module.

Additionally in accordance with a preferred embodiment of the present invention the secret shares are formed in accordance with a threshold scheme such that the secret reconstruction module only needs a predetermined number of any of the secret shares in order to form the content decryption input, the predetermined number being greater than one but less than the number of the other devices.

Moreover in accordance with a preferred embodiment of the present invention the threshold scheme is based on the Shamir secret-sharing method.

Further in accordance with a preferred embodiment of the present invention the content consumer is a media player, and the decrypted content includes a video frame.

Still further in accordance with a preferred embodiment of the present invention the content decryption input is an entitlement control message.

Additionally in accordance with a preferred embodiment of the present invention the content consumer is a computer processor, and the decrypted content includes at least part of a data file.

Moreover in accordance with a preferred embodiment of the present invention the content decryption input is a decryption key.

Further in accordance with a preferred embodiment of the present invention the secret share distribution module is operative to distribute each of the secret shares to the other devices with a message authentication code of a corresponding one of the secret shares, the secret share decryption module being operative to verify the message authentication code of each of the at least some secret shares received by the secret share receive module.

Still further in accordance with a preferred embodiment of the present invention the secret share distribution module is operative to distribute each of the secret shares to the other devices with a message authentication code of the content decryption input, the secret share reconstruction module being operative to verify the message authentication code of the content decryption input.

There is also provided in accordance with still another preferred embodiment of the present invention a system for restricting access to encrypted content stored in a consuming device which is part of a network including other devices, the system including a plurality of operationally connected elements including a secret share splitting module to split a content decryption input into a plurality of secret shares, a secret share encryption module to encrypt the secret shares thereby rendering encrypted secret shares, and a broadcast module to broadcast the encrypted content to the consuming device, and the encrypted secret shares to at least one of the consuming device and the other devices.

Additionally in accordance with a preferred embodiment of the present invention the secret share splitting module is operative to split the content decryption input into the secret shares in accordance with a threshold scheme such that only a predetermined number of any of the secret shares is needed in order to re-form the content decryption input, the predetermined number being greater than one but less than the number of the other devices.

Moreover in accordance with a preferred embodiment of the present invention the threshold scheme is based on the Shamir secret-sharing method.

Further in accordance with a preferred embodiment of the present invention the secret share encryption module is operative to encrypt the secret shares, such that each of the encrypted secret shares is uniquely encrypted for decryption by a corresponding one of the other devices.

Still further in accordance with a preferred embodiment of the present invention the secret share encryption module is operative to encrypt the secret shares, such that each of the encrypted secret shares is doubly encrypted by an inner encryption and then an outer encryption such that the outer encryption needs to be decrypted before the inner encryption, the outer encryption being uniquely encrypted for decryption by a corresponding one of the other devices, the inner encryption being for decryption only by the consuming device.

There is also provided in accordance with still another preferred embodiment of the present invention a method for restricting access to encrypted content stored in a consuming device which is part of a network including other devices, the method including storing the encrypted content therein, distributing a plurality of secret shares to the other devices, receiving at least some of the secret shares from the other devices, forming a content decryption input from the at least some secret shares, decrypting the encrypted content using the content decryption input thereby rendering decrypted content, and using the decrypted content decrypted, wherein the secret shares distributed to the other devices are in an encrypted format for at least one of decryption by the consuming device and the other devices.

There is also provided in accordance with still another preferred embodiment of the present invention a method for restricting access to encrypted content stored in a consuming device which is part of a network including other devices, the method including splitting a content decryption input into a plurality of secret shares, encrypting the secret shares thereby rendering encrypted secret shares, and broadcasting the encrypted secret shares to at least one of the consuming device and the other devices.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
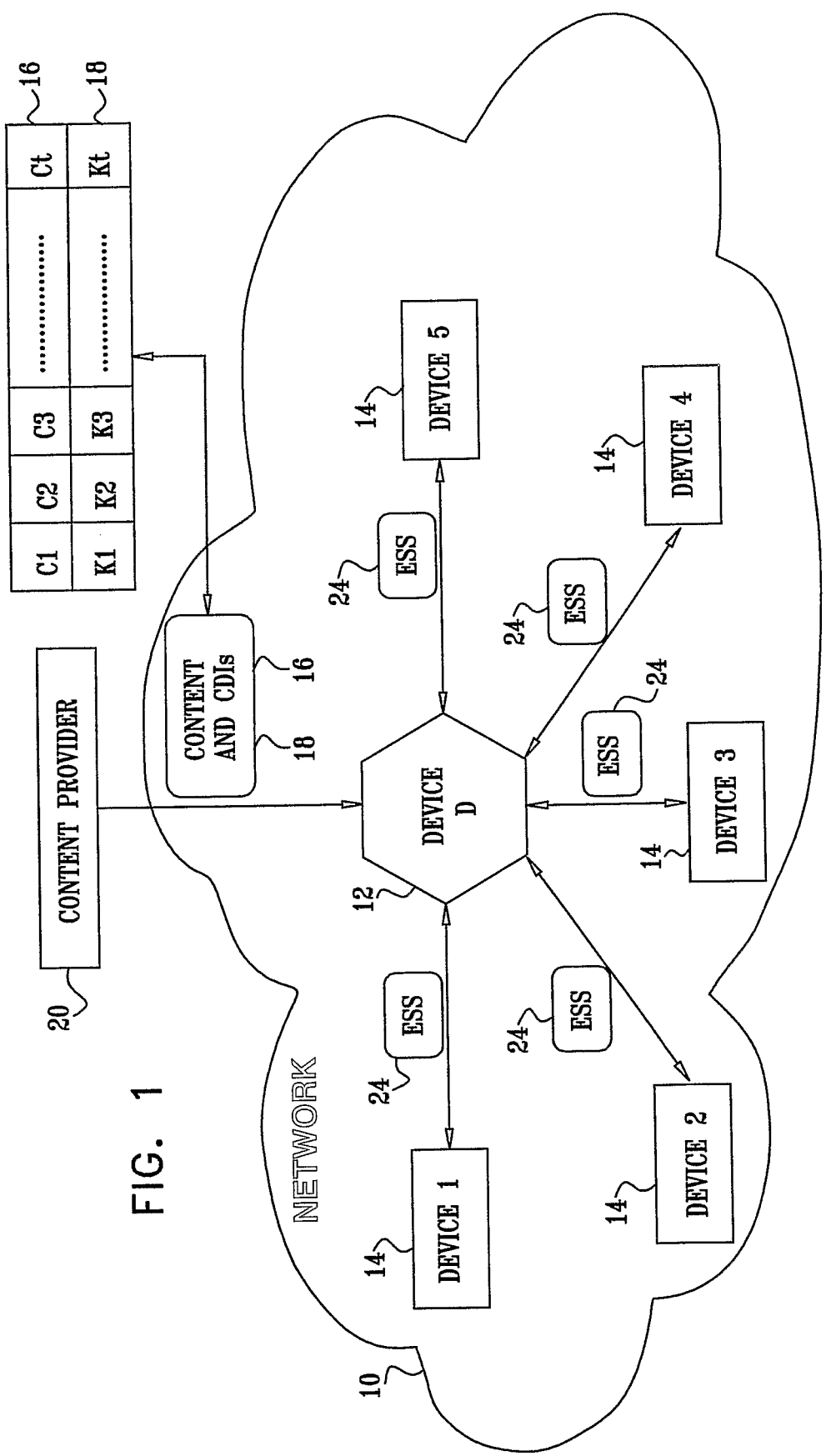
FIG. 1 is a simplified block diagram view of a network including a consuming device and other devices constructed and operative in accordance with a preferred embodiment of the present invention.

Reference is now made to FIG. 1, which is a simplified block diagram view of a network 10 including a plurality of interconnected devices including a consuming device 12 (denoted Device D) and other devices 14 (denoted devices 1 to 5) constructed and operative in accordance with a preferred embodiment of the present invention.

In a Pay-TV environment, for example, when the consuming device 12, typically a PVR in the network 10, purchases and records content 16 from a content provider 20, the content provider 20 sends the content 16, encrypted by a plurality of content decryption inputs CDIs 18. The content provider 20 also sends the CDIs 18 along with the content 16. The CDIs 18 are denoted by $K_j$ in FIG. 1 (for example, $K_1, K_2 \ldots K_t$), where j is a value between 1 and t. Similarly, the content 16 typically includes portions of the content 16, $C_j$ (denoted $C_1$, $C_2 \ldots C_t$ in FIG. 1). Therefore, each content portion $C_j$ preferably has a corresponding content decryption input, $K_j$. Each CDI 18 is preferably split into encrypted secret shares (ESSs) 24 using a secret sharing method (for example, but not limited to, the Shamir secret-sharing method) by the consuming device 12. The ESSs 24 are then typically distributed by the consuming device 12 to the other devices 14 in the network 10.

For playback, the consuming device 12 preferably establishes a viewing session with a number of the other devices 14 in the network 10. The consuming device 12 receives the ESSs 24 and then the consuming device 12 decrypts the ESSs 24. The consuming device 12 then computes the original CDIs 18 from the decrypted ESSs 24. The CDIs 18 are then used to decrypt the content 16 for playing by consuming device 12.

The above example described a preferred embodiment of the present invention with reference to pay-TV. However, it will be appreciated by those ordinarily skilled in the art that the preferred embodiment of the present invention can similarly be applied to other security scenarios, for example, but not limited to, file and disk security, wherein there is typically one portion of content $C_1$ encrypted using one content decryption input, $K_1$. Therefore, when encrypting sensitive files or file systems (for example, but not limited to, PGP disks), the content decryption input, $K_1$, is preferably split into secret shares using a suitable secret sharing method, for example, but not limited to, the Shamir secret-sharing method. The secret shares are then encrypted forming the ESSs 24. The consuming device 12 then distributes the ESSs 24 to the other devices 14 (for example, but not limited to, secure static devices) in the network 10. The file can be viewed/file system can be mounted, only on the same network 10, or a network explicitly provided with the ESSs 24.

In all cases, including Pay-TV and file and disk security, the original CDI 18 is preferably erased after the CDI 18 is split into the secret shares, as well as after the CDI 18 has been restored and used. Stealing the CDI(s) 18 then typically requires an intrusive attack on the consuming device 12 when the consuming device 12 is live, online and on the network 10, in other words, while the CDI 18 is in the memory of the consuming device 12 during the decryption process.

The other devices 14 may be any suitable device which has communication capabilities and a memory for storing the ESSs 24.

It is possible to split and distribute the content 16 as well as the CDI(s) 18, in which case the $C_j$ is omitted and $K_j$ denotes the content 16 and the CDIs 18. However, splitting and distributing the content 16 as well as the CDIs 18 implies greater computation cost and network load.

The preferred embodiment described above is an example of a trusted device model whereby the consuming device 12 computes the secret shares for each of the CDI(s) 18 ($K_1$, $K_2$, ..., $K_t$) for distribution, after encryption, to the other devices 14. However, in certain scenarios, it is desirable to adopt a non-trusted device model, which may be useful, for example, in Pay-TV and other broadcast scenarios. In the non-trusted device model, the content provider 20 computes the ESSs 24 for each CDI 18. In the non-trusted device model the CDIs 18 are not broadcast to the consuming device 12. The consuming device 12 receives the ESSs 24 from the content provider 20. The ESSs 24 cannot be decrypted by the consuming device 12. The ESSs 24 are distributed by the consuming device 12 to the other devices 14. The other devices 14 are able to decrypt the ESSs 24 for use by the consuming device 12. The non-trusted device model is described in more detail with reference to FIGS. 3-8.

The choice of trusted/non-trusted model depends on the level of trust of the consuming device 12, considerations of computational load on the content provider 20, and the knowledge of the network membership by the content provider 20. The final factor can be established by explicit enrollment or periodic updates through an upstream channel (Internet Protocol (IP), cable report-back or phone-based callback).

The trusted model is now described in more detail.

Figure 2:
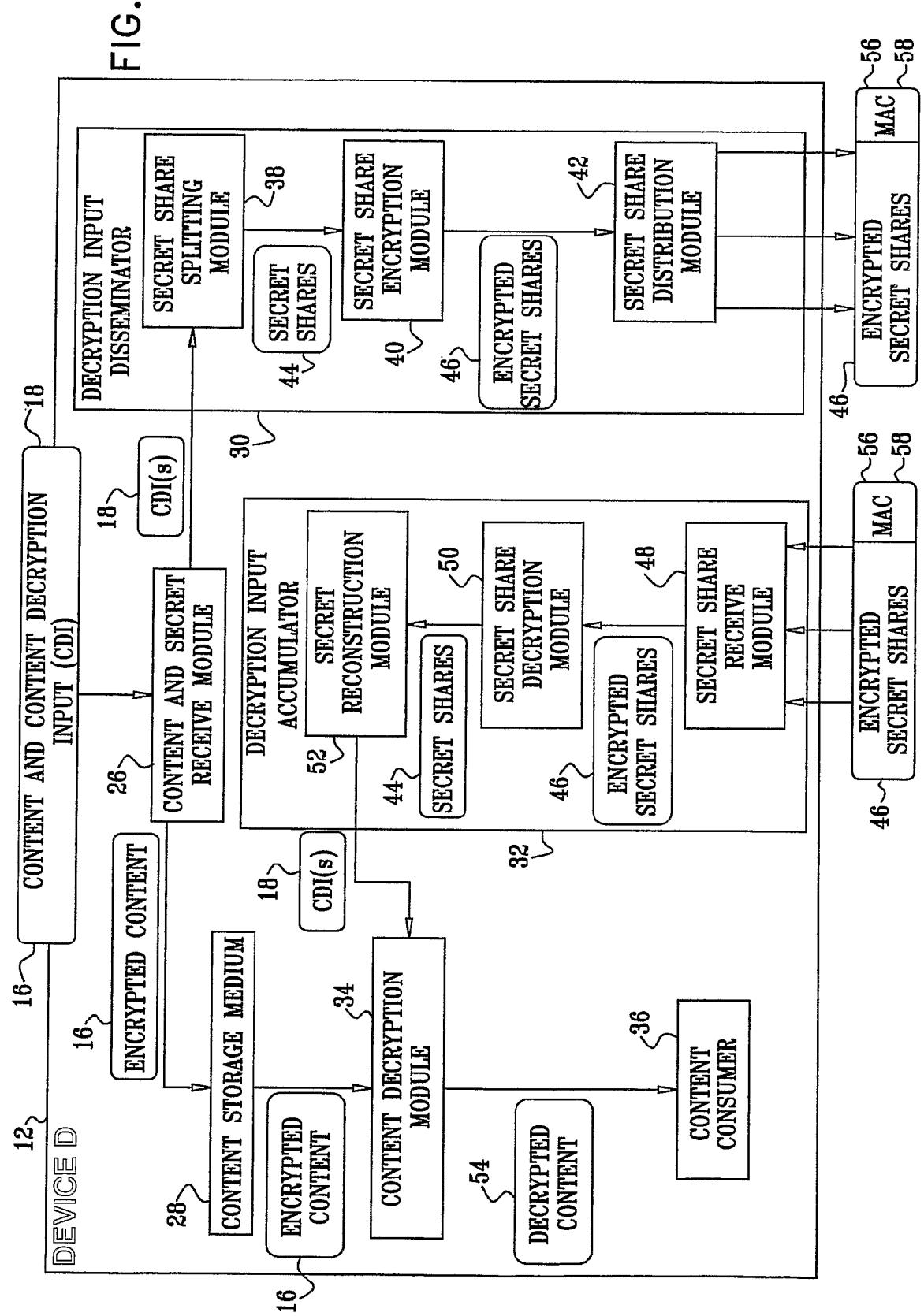
FIG. 2 is a simplified block diagram view of the consuming device of FIG. 1.

Reference is now made to FIG. 2, which is a simplified block diagram view of the consuming device 12 of FIG. 1. Consuming device 12 preferably implements a system for restricting access to the encrypted content 16 stored in the consuming device 12. The system preferably includes a plurality of operationally connected elements typically including a content and secret receive module 26, a content storage medium 28, a decryption input disseminator 30, a decryption input accumulator 32, a content decryption module 34 and a content consumer 36.

The content and secret receive module 26 is preferably operative to receive the encrypted content 16 and CDIs 18 for forwarding to content storage medium 28 and the decryption input disseminator 30, respectively.

The content storage medium 28 is preferably operative to store the encrypted content 16 therein.

The decryption input disseminator 30 typically includes a secret share splitting module 38, a secret share encryption module 40 and a secret share distribution module 42. The secret share splitting module 38 preferably receives the CDIs 18 from the content and secret receive module 26. The secret share splitting module 38 is generally operative to split each CDI 18 into a plurality of secret shares 44. Additionally, the secret share splitting module 38 is preferably operative to erase each CDI 18 from the consuming device 12 after the secret shares 44 are created.

The secret share encryption module 40 is preferably operative to encrypt the secret shares 44 created by the secret share splitting module 38 resulting in a plurality of encrypted secret shares 46. The secret shares 44 are preferably encrypted by the secret share encryption module 40 only for decryption by the secret share decryption module 50 of the consuming device 12. The term "only for decryption" as used in the specification and claims is defined as the encryption is performed for decryption by a particular decryption method and/or decryption key without having to resort to hacking methods in order to decrypt the encrypted secret shares 46. The encrypted secret shares 46 are typically encrypted with the same key, Known only to the consuming device 12. Therefore, the secret shares 44 cannot be used by any other device to restore the original CDI(s) 18 without employing hacking methods.

The secret share distribution module 42 is preferably operative to distribute the encrypted secret shares 46 to the other devices 14 (FIG. 1).

The encrypted secret shares 46 are typically held by the other devices 14 until the consuming device 12 needs the encrypted secret shares 46 for decrypting the content 16.

The decryption input accumulator 32 preferably includes a secret share receive module 48, a secret share decryption module 50 and a secret reconstruction module 52.

The secret share receive module 48 is generally operative to receive at least some of the encrypted secret shares 46 from the other devices 14 for forwarding to the secret share decryption module 50.

The secret share decryption module 50 is typically operative to decrypt the encrypted secret shares 46 received by the secret share receive module 48 thereby yielding the decrypted secret shares 44. The secret share decryption module 50 preferably forwards the decrypted secret shares 44 to the secret reconstruction module 52.

The secret reconstruction module 52 is preferably operative to form each CDI 18 from the secret shares 44.

The content decryption module 34 is generally operative to receive the encrypted content 16 from the content storage medium 28 and to receive the CDI(s) 18 from the secret reconstruction module 52. The content decryption module 34 is also generally operative to decrypt the encrypted content 16 using the CDI(s) 18 thereby rendering decrypted content 54. After the content 16 is decrypted, the CDI(s) 18 are erased, preferably immediately. Additionally, the CDIs 18 are preferably never stored in non-volatile storage.

The content consumer 36 is preferably operative to use the decrypted content 54 decrypted by the content decryption module 34. It will be appreciated by those ordinarily skilled in the art that the content consumer 36 may be any suitable device for playing/using content. For example, in a media environment, the decrypted content 54 typically includes video and/or audio frames, the content consumer 36 typically being a media player, for example, but not limited to, a Television set-top box, a mobile telephone or any other suitable media player, the CDIs 18 typically being entitlement control messages or other suitable key stream components.

By way of another example, in a data security environment, the decrypted content 54 typically includes at least part of a data file, the content consumer 36 typically being a computer processor and the CDI 18 being a decryption key.

The secret share splitting module 38 is preferably operative to split the CDI(s) 18 into the secret shares 44 in accordance with a threshold scheme such that the secret reconstruction module 52 only needs a predetermined number, r, of any of the secret shares 44 in order to form any one CDI 18. The predetermined number, r, is typically greater than one but less than, or equal to, the number of the other devices 14. The predetermined number is preferably less than the number of the other devices 14.

The predetermined number, r, of secret share owners required to participate in recreating each CDI 18 from the ESSs 24, is optionally defined by the content provider, or the device distributing the shares, and/or by network properties (for example, but not limited to, the number of secure trusted devices). The predetermined number, r, is preferably based on the desired content security level and/or on the number of devices forming the home network.

In accordance with a most preferred embodiment of the present invention, the threshold scheme is based on the Shamir secret-sharing method. It will be appreciated by those ordinarily skilled in the art that other suitable threshold schemes as well as other suitable non-threshold schemes may used.

The following security schemes are optionally implemented to enhance security.

First, secret share distribution module 42 is preferably operative to distribute each of the encrypted secret shares 46 to the other devices 14 with a message authentication code (MAC) 56 of a corresponding one of the encrypted secret shares 46. The secret share decryption module 50 is operative to verify the message authentication code 56 of each of the decrypted secret shares 44. The message authentication code 56 is therefore verified before accepting any secret share 44 for use in reconstructing any of the CDIs 18.

Second, the secret share distribution module 42 is preferably operative to distribute each of the encrypted secret shares 46 to the other devices 14 with a message authentication code 58 of a corresponding one of the CDIs 18. The secret reconstruction module 52 is operative to verify the message authentication code 58 of each of the reconstructed CDIs 18. The message authentication code 58 is verified after recomputing the original secret, and serves as proof of the correctness of the original secret.

It will be appreciated by those ordinarily skilled in the art that MACs may be used with the other embodiments of the present invention. Additionally, it will be appreciated by those ordinarily skilled in the art that the content provider 20 may also be able to attach MACs to the CDIs 18. In the embodiments of the invention where the content provider 20 distributes secret shares, the content provider 20 may also distribute MACs with the secret shares.

The non-trusted model is now described in more detail with reference to FIGS. 3-8.

Figure 3:
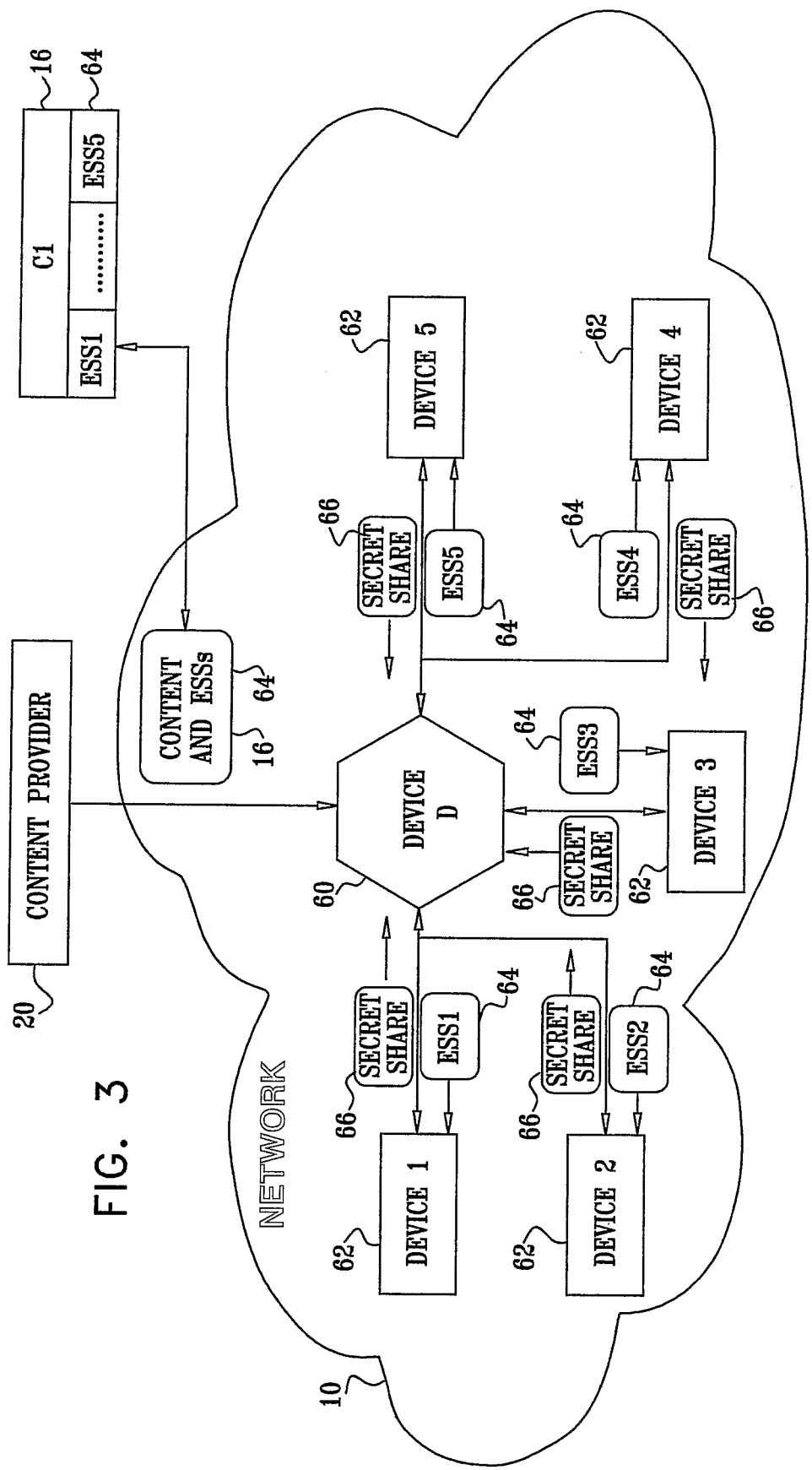
FIG. 3 is a simplified block diagram view of a network including a consuming device and other devices constructed and operative in accordance with a first alternative preferred embodiment of the present invention.

Reference is now made to FIG. 3, which is a simplified block diagram view of a network including a consuming device 60 and other devices 62 constructed and operative in accordance with a first alternative preferred embodiment of the present invention. In the first alternative preferred embodiment, the content provider 20 does not send the CDIs 18 with the content 16. Instead, the content provider 20 prepares secret shares. The content provider 20 then encrypts the secret shares resulting in encrypted secret shares 64. The secret shares are encrypted for decryption by the other devices 62 only and not for decryption by the consuming device 60. Therefore, the consuming device 60 is forced to distribute the encrypted secret shares 64 to the other devices 62 for decryption before the secret shares can be used to recreate the CDIs 18. Additionally, as the consuming device 60 does not receive the CDIs 18 from the content provider 20, there is no doubt as to the CDIs 18 not being erased before the secret shares are distributed to the other devices 62.

Each of the encrypted secret shares 64 sent by the content provider 20 for receipt by the consuming device 60 is preferably encrypted such that each encrypted secret share 64 is uniquely encrypted for decryption by a corresponding other device 62. In other words, each encrypted secret share 64 can only be decrypted (using non-hacking methods) by one of the other devices 62 which has the unique key and/or method for decrypting the encrypted secret share 64. Therefore, the consuming device 60 is forced to distribute the secret shares to the other devices 62 determined by the content provider 20.

When the consuming device 60 wants to play/use the content 16, the other devices 62 preferably decrypt the encrypted secret shares 64 thereby yielding decrypted secret shares 66. The decrypted secret shares 66 are sent to the consuming device 60 for reconstructing the CDI(s) 18.

Figure 4:
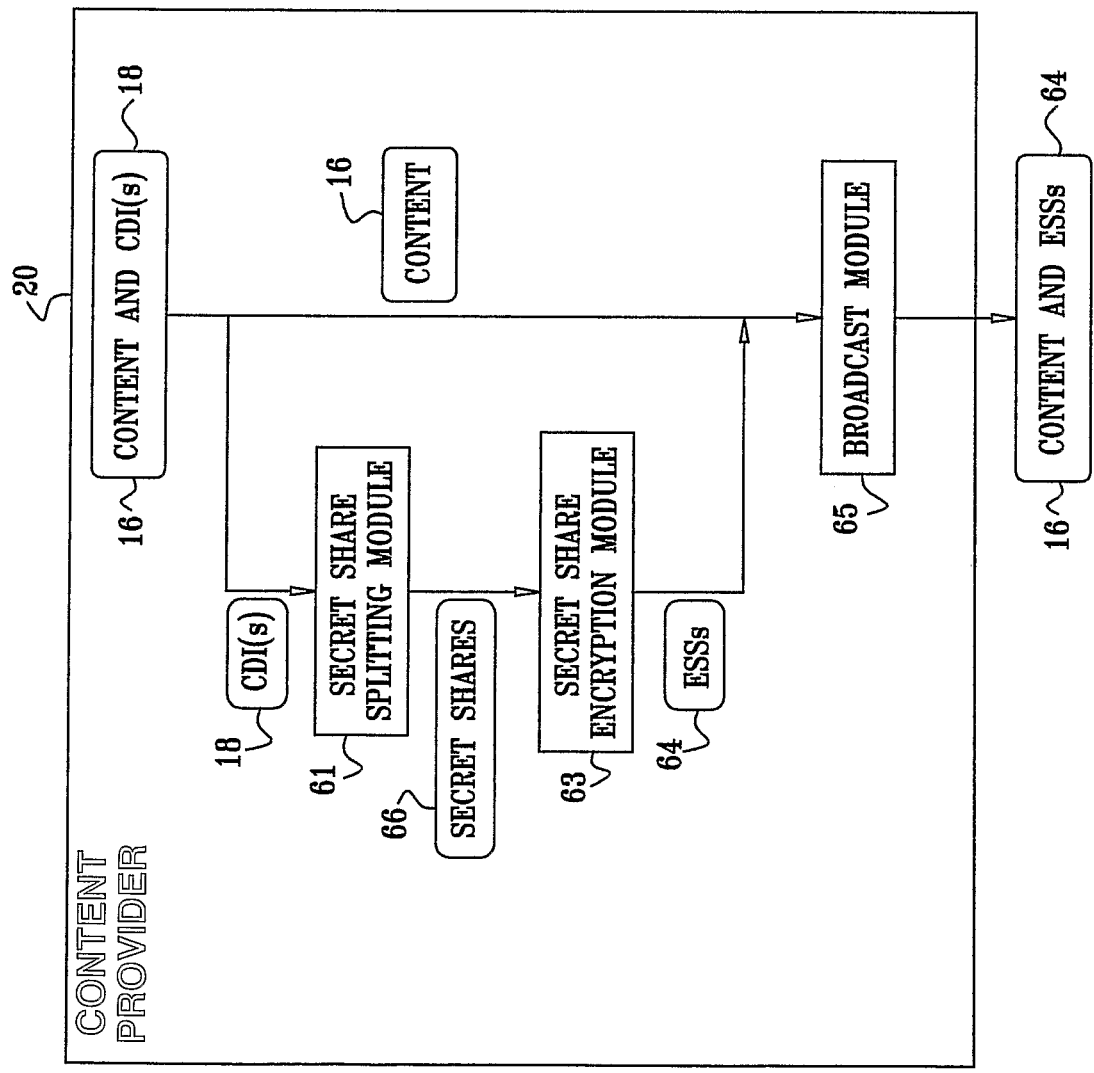
FIG. 4 is a simplified block diagram of a content provider of FIG. 3.

Reference is now made to FIG. 4, which is a simplified block diagram of the content provider 20 of FIG. 3. The content provider 20 preferably includes a secret share splitting module 61, a secret share encryption module 63 and a broadcast module 65.

The secret share splitting module 61 receives the CDIs 18 and splits each of the CDIs 18 into the secret shares 66 preferably in accordance with a threshold scheme such that only a predetermined number of any of the secret shares is needed in order to re-form each CDI 18. The predetermined number is greater than one but less or equal to the number of the other devices 62 (FIG. 3). The predetermined number is preferably less than the number of the other devices 62 (FIG. 3).

The threshold scheme is preferably based on the Shamir secret-sharing method. However, it will be appreciated by those ordinarily skilled in the art that other suitable threshold schemes and non-threshold schemes may be used.

The secret share encryption module 63 encrypts the secret shares 66 thereby rendering the encrypted secret shares 64, such that each of the encrypted secret shares 64 is uniquely encrypted for decryption by a corresponding one of the other devices 62 (FIG. 3).

The broadcast module 65 broadcasts the encrypted secret shares 64 and the content 16 to the consuming device 20. It will be appreciated by those ordinarily skilled in the art that the encrypted secret shares 64 may be broadcast directly to the other devices 62 (FIG. 3).

Figure 5:
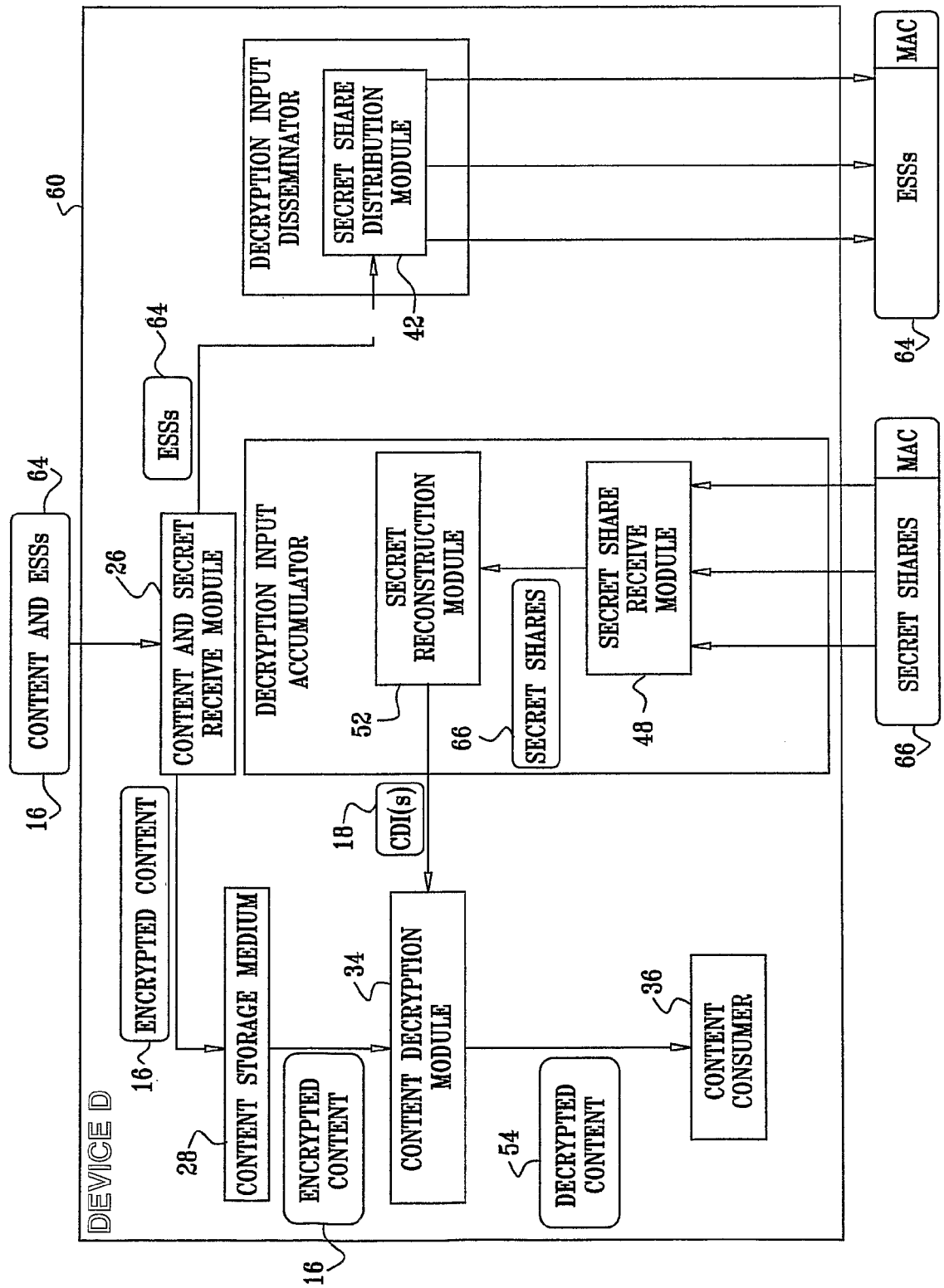
FIG. 5 is a simplified block diagram view of the consuming device of FIG. 3.

Reference is now made to FIG. 5, which is a simplified block diagram view of the consuming device 60 of FIG. 3. The consuming device 60 is substantially the same as the consuming device 12 except for the following differences. Due the functionality described with reference to FIGS. 3 and 4, the consuming device 60 does not require the secret share splitting module 38, the secret share encryption module 40 nor secret share decryption module 50. The content and secret receive module 26 preferably receives the content 16 and the encrypted secret shares 64. The content and secret receive module 26 preferably forwards the content 16 to the content storage medium 28 and the encrypted secret shares 64 to the secret share distribution module 42. The secret share distribution module 42 preferably distributes the encrypted secret shares 64 to the other devices 62 (FIG. 3). The other devices 62 generally decrypt the encrypted secret shares 64 yielding the decrypted secret shares 66.

For playback/use of the content 16, the decrypted secret shares 66 are preferably received by the secret share receive module 48. The decrypted secret shares 66 are preferably passed by the secret share receive module 48 to the secret reconstruction module 52 in order to form the CDI(s) 18 from the decrypted secret shares 66. The content 16 is then preferably decrypted by the content decryption module 34 yielding the decrypted content 54. The decrypted content 54 is then generally available for play/use by the content consumer 36.

As described above with reference to FIG. 4, the encrypted secret shares 64 are preferably formed in accordance with a threshold scheme. Therefore, the secret reconstruction module 52 only needs a predetermined number of any of the secret shares 66 in order to form the CDI(s) 18. The predetermined number is typically greater than one but less than, or equal to the number of the other devices. The predetermined number is preferably less than the number of the other devices. The threshold scheme is preferably based on the Shamir secret-sharing method. However, it will be appreciated by those ordinarily skilled in the art that other suitable threshold schemes and non-threshold schemes may be used.

It will be appreciated by those ordinarily skilled in the art that the encrypted secret shares 64 can be distributed directly by the content provider 20 (FIG. 3) to the other devices 62 (FIG. 3) if an appropriate communication link exists between the content provider 20 and the other devices 62. Where the content provider 20 distributes the encrypted secret shares 64 directly to the other devices 62, the secret share distribution module 42 is not required.

Figure 6:
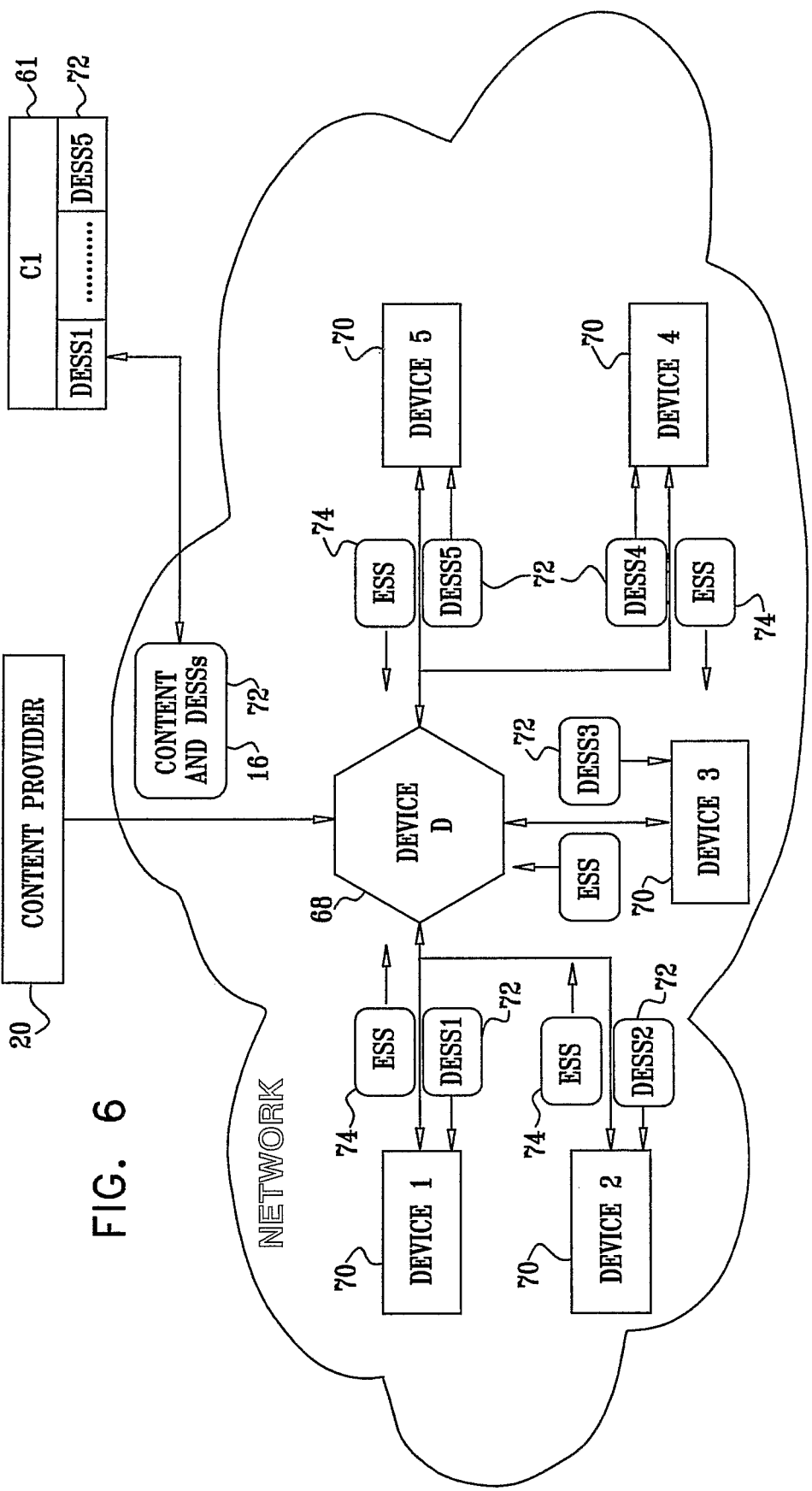
FIG. 6 is a simplified block diagram view of a network including a consuming device and other devices constructed and operative in accordance with a second alternative preferred embodiment of the present invention.

Reference is now made to FIG. 6, which is a simplified block diagram view of a network including a consuming device 68 and other devices 70 constructed and operative in accordance with a second alternative preferred embodiment of the present invention. In the second alternative preferred embodiment, the content provider 20 does not send the CDIs 18 with the content 16. Instead, the content provider 20 prepares secret shares.

The content provider 20 then preferably encrypts the secret shares twice, resulting in doubly encrypted secret shares (DESSs) 72 for sending to the consuming device 68. The DESSs 72 are preferably doubly encrypted by an inner encryption and then an outer encryption such that the outer encryption needs to be decrypted before the inner encryption. The outer encryption is preferably uniquely encrypted for decryption, by non-hacking methods, by a corresponding one of the other devices 70, similar to the encryption of the encrypted secret shares 64 (FIG. 3). The inner encryption is preferably encrypted for decryption, by non-hacking methods, only by the consuming device 68, similar to the encryption of the ESSs 24 (FIG. 1).

Therefore, the consuming device 68 is forced to distribute the DESSs 72 to the other devices 70 for decrypting the outer encryption. Additionally, the other devices 70 cannot use the DESSs 72 as the inner encryption is only for decryption by the consuming device 68.

When the consuming device 68 wants to play/use the content 16, the other devices 70 preferably decrypt the DESSs 72 thereby yielding encrypted secret shares 74 still encrypted by the inner encryption. The encrypted secret shares 74 are preferably sent to the consuming device 68 for decryption and reconstructing the CDI(s) 18.

Figure 7:
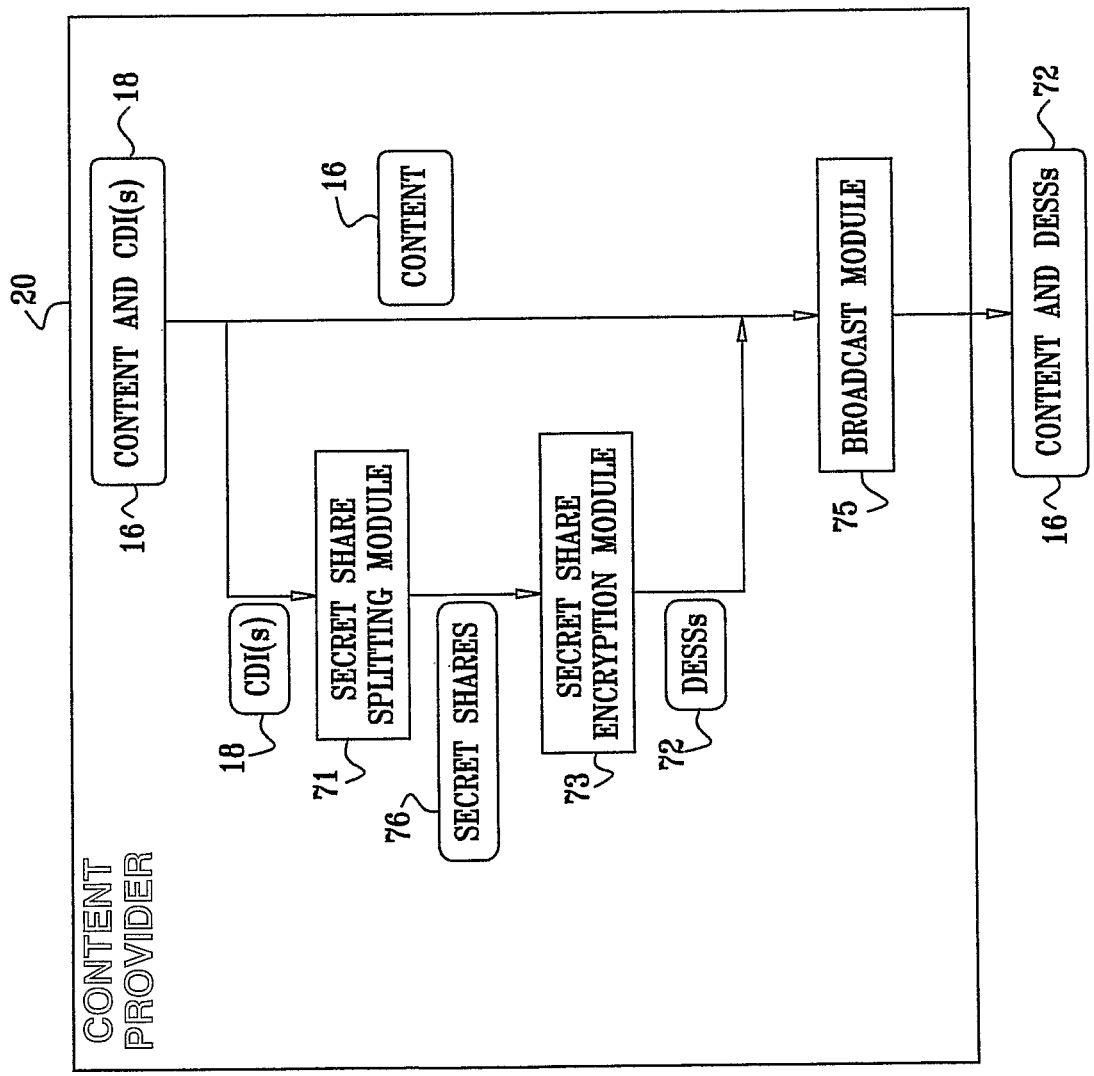
FIG. 7 is a simplified block diagram of a content provider of FIG. 6.

Reference is now made to FIG. 7, which is a simplified block diagram of the content provider 20 of FIG. 6. The content provider 20 preferably includes a secret share splitting module 71, a secret share encryption module 73 and a broadcast module 75.

The secret share splitting module 71 receives the CDIs 18 and splits each of the CDIs 18 into the secret shares 76 preferably in accordance with a threshold scheme such that only a predetermined number of any of the secret shares is needed in order to re-form each CDI 18. The predetermined number is greater than one but less or equal to the number of the other devices 70 (FIG. 6). The predetermined number is preferably less than the number of the other devices 70 (FIG. 6).

The threshold scheme is preferably based on the Shamir secret-sharing method. However, it will be appreciated by those ordinarily skilled in the art that other suitable threshold schemes and non-threshold schemes may be used.

The secret share encryption module 73 doubly encrypts the secret shares 76 thereby rendering the DESSs 72.

The broadcast module 75 broadcasts the DESSs 72 and the content 16 to the consuming device 20. It will be appreciated by those ordinarily skilled in the art that the DESSs 72 may be broadcast directly to the other devices 70 (FIG. 6).

Figure 8:
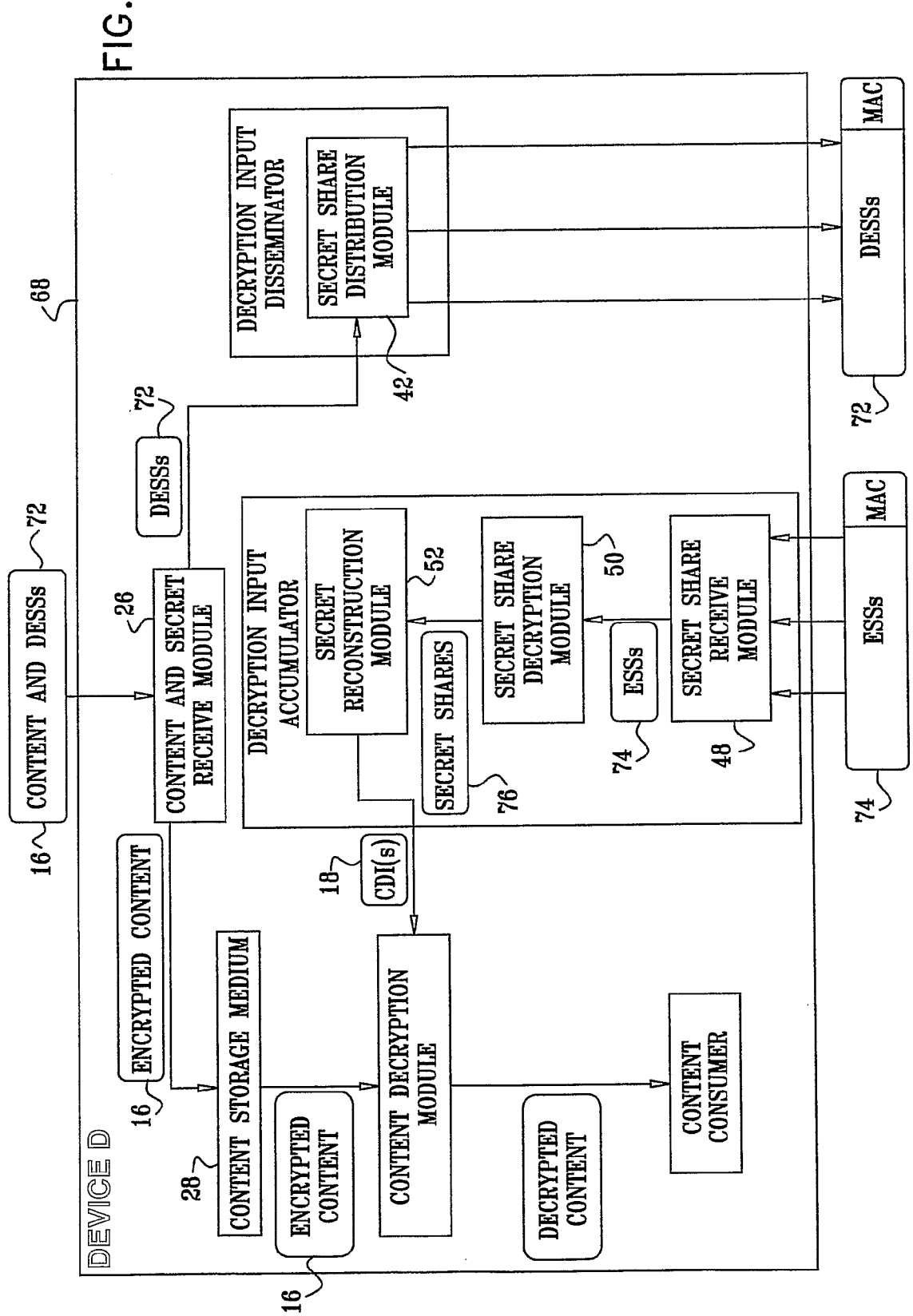
FIG. 8 is a simplified block diagram view of the consuming device of FIG. 6.

Reference is now made to FIG. 8, which is a simplified block diagram view of the consuming device 68 of FIG. 6. The consuming device 68 is substantially the same as the consuming device 60 (FIG. 5) except for the following differences. The content and secret receive module 26 preferably receives the content 16 and the DESSs 72. The content and secret receive module 26 preferably forwards: the content 16 to the content storage medium 28; and the DESSs 72 to the secret share distribution module 42 for forwarding to the other devices 70 (FIG. 6). The other devices 70 typically decrypt the DESSs 72 yielding the encrypted secret shares 74. For play/use of the content 16, the encrypted secret shares 74 are preferably received by the secret share receive module 48. The secret share receive module 48 typically forwards the encrypted secret shares 74 to the secret share decryption module 50 for decryption, thereby yielding decrypted secret shares 76. The secret share decryption module 50 generally forwards the decrypted secret shares 76 to the secret reconstruction module 52. The decrypted secret shares 76 are preferably reconstructed by the secret reconstruction module 52 to form the CDI(s) 18 for use in decrypting the content 16.

Figure 9:
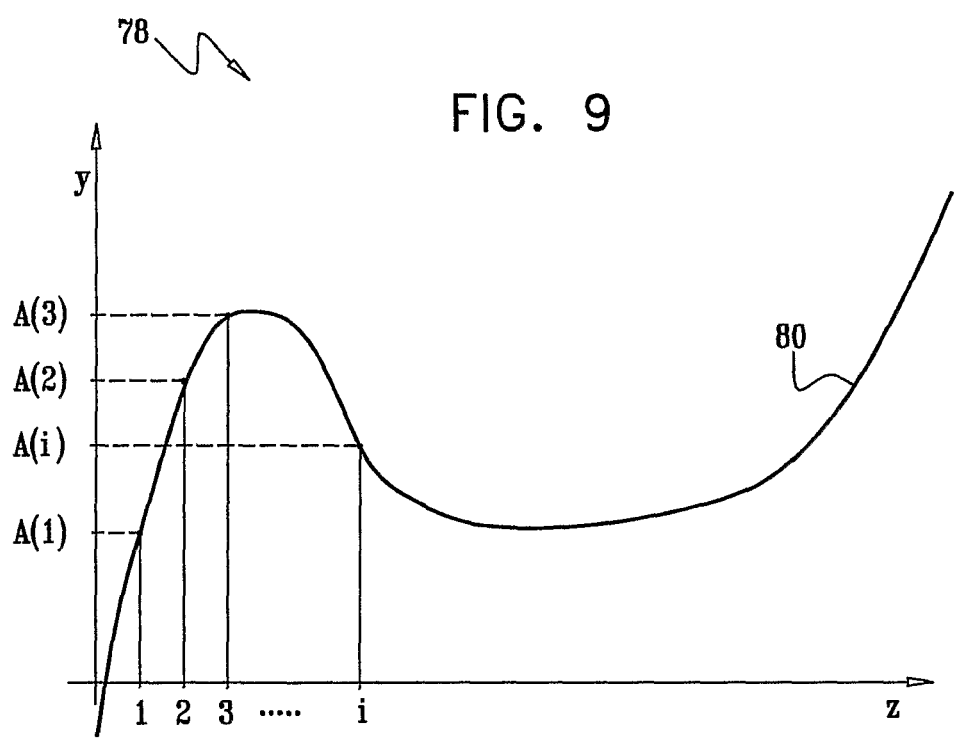
FIG. 9 is a graph showing a polynomial to illustrate the Shamir secret sharing scheme.

Reference is now made to FIG. 9, which is a graph 78 showing a polynomial 80 to illustrate the Shamir secret sharing scheme. The secret sharing method is now described in more detail with reference to the Shamir secret sharing scheme. However, it will be appreciated by those ordinarily skilled in the art that other suitable threshold and non-threshold secret sharing schemes can be used to implement the system and method of the present invention. By way of introduction the Shamir secret sharing method uses polynomial interpolation. Each device on the network preferably receives a serial number, z; z is a small integer between 1 and N. L=|K| denotes the maximum number of bits in one CDI 18 (FIG. 1). M denotes the modulus, a large number that is close enough to $2^L$, so that M is greater than the binary representation of any CDI 18. It is preferably required that M should not have any divisors less than or equal to the device numbers of the network 10 (FIG. 1); for simplicity, we generally require that M be prime. M should preferably be greater than N.

As described above with reference to FIG. 2, r is the predetermined number of secret share owners required to participate in the CDI 18 re-generation. Therefore, the polynomial needs r coefficients.

As described above with reference to FIG. 1, $K_1, K_2, \ldots, K_t$ denotes the sequence of the CDIs 18 for the content 16. For each CDI 18 ($K_j$) that we want to split into secret shares, we preferably take the binary representation of the CDI 18 ($K_j$) padded to L bits. We then preferably take the binary representation as the free coefficient of the polynomial.

For the other r−1 coefficients, we need r−1 arbitrary L-bit secret numbers such that no strict subset of the coefficients reveals $K_j$. The coefficients are denoted $N_1 \ldots N_{r-1}$. Optionally, the coefficients may be obtained by using at least some of the other CDIs 18 ($K_{j+1}, K_{j+2}, \ldots$) thereby allowing the distribution of r CDIs 18 at a time. However, the first method of determining the r−1 coefficients is more secure.

Alternate methods of generating the L*(r−1) bits include the following secure methods. First, use a secure random or pseudo-random number generator to determine the r−1 coefficients. Second, use a well-known hash function (for example, but not limited to, SHA-1 or MD5) with $K_j$ as the original input. The r−1 coefficients are obtained by repeatedly hashing $K_j$ and concatenating the results.

For a device z and CDI 18 ($K_j$), the secret share of z, namely, $A_j(z)$ is preferably as follows:

$$A_j(z) = K_j + N_1*z + N_2*z^2 + \ldots + N_{r-1}*z^{r-1} \pmod{M} \quad \text{(Equation 1)},$$

which can also be written in the form, $$A_j(z) = K_j + \sum_{i=1}^{r-1} (N_i * z^i) \pmod{M}. \quad \text{(Equation 2)}$$

Equations 1 and 2 describe a polynomial; for example, the polynomial 80. The number of the device is given on the axis labeled z of the graph 78. The value of the secret share is given on the axis labeled y of the graph 78. So for example, the device z receives secret shares $A_1(z), A_2(z), \ldots, A_r(z)$.

Since the Shamir secret sharing scheme is a threshold scheme, it is possible for a device to hold more than one secret share. Such a device would be privileged, as the privileged device would effectively replace several devices. It is also possible to pass the extra secret shares to other devices when new devices become available. This is generally useful in enrollment and disenrollment, discussed below.

Figure 10:
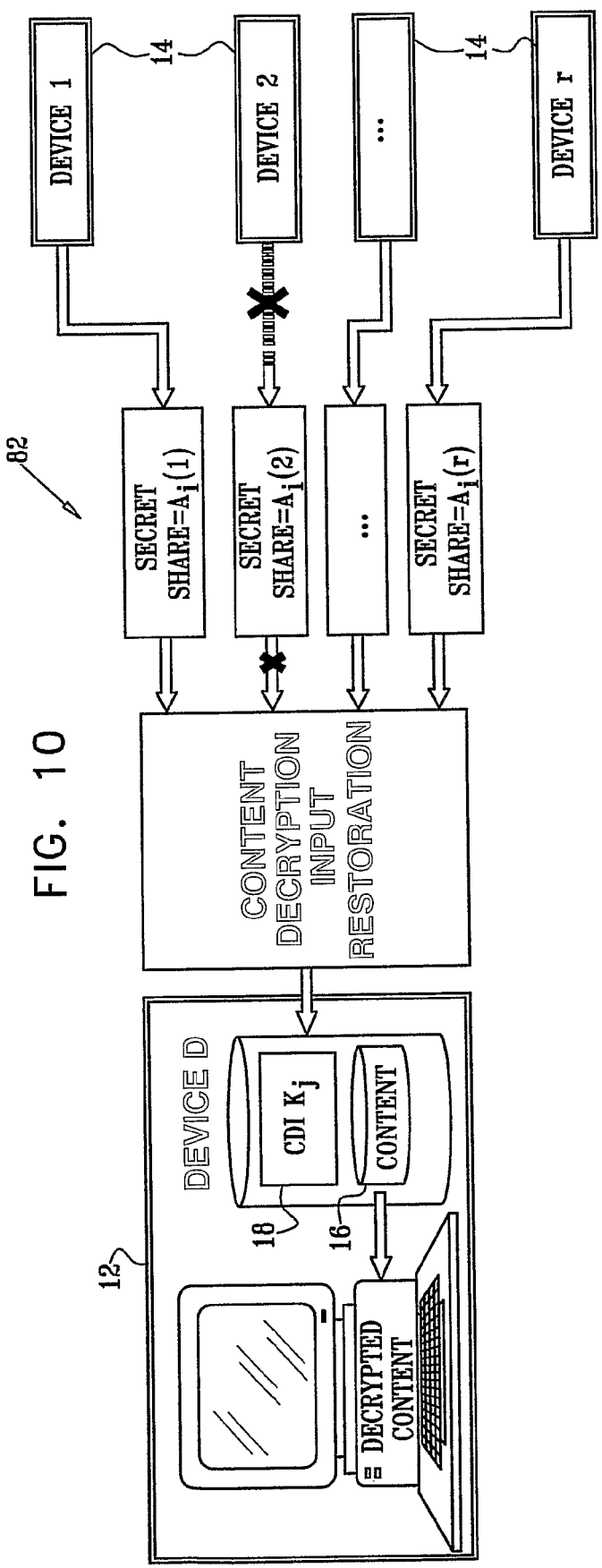
FIG. 10 is a simplified block diagram view illustrating content decryption input restoration for use by the devices of FIGS. 1, 3 and 6 according to the Shamir secret sharing scheme.

Reference is now made to FIG. 10, which is a simplified block diagram view illustrating content decryption input restoration for use by the devices of FIGS. 1, 3 and 6 according to the Shamir secret sharing scheme. The consuming device 12 (Device D) chooses at least r network peers, namely the other devices 14, holding a plurality of secret shares 82 for the content 16 that consuming device 12 wants to decrypt. To decrypt portion j of the encrypted content 16 ($C_j$), the consuming device 12 requests the secret share $A_j(z)$ from the other devices 14. The consuming device 12 then restores the CDI 18 ($K_j$). $K_j$ is then used by consuming device 82 to decrypt $C_j$.

The preferable mathematical treatment involved in determining $K_j$ from the secret shares 82 is described below.

The participating devices indices (including the index of device D) are generally denoted $V_1, V_2, V_2, \ldots, V_r$.

To restore $K_j$, the consuming device 12 (device D) preferably gathers the secret shares $A_j(V_1), A_j(V_2), \ldots, A_j(V_r)$ and solves a linear equation system modulo M, defined by the Vandermonde matrix:

$$\begin{pmatrix} 1 & V_1 & V_1^2 & \ldots & V_1^{r-1} \\ 1 & V_2 & V_2^2 & \ldots & V_2^{r-1} \\ \ldots & \ldots & \ldots & \ldots & \ldots \\ 1 & V_r & V_r^2 & \ldots & V_r^{r-1} \end{pmatrix} \begin{pmatrix} K_j \\ N_1 \\ \ldots \\ N_{r-1} \end{pmatrix}_U = \begin{pmatrix} A_j(V_1) \\ A_j(V_2) \\ \ldots \\ A_j(V_r) \end{pmatrix}$$

The determinant of the matrix is $\Pi(V_j - V_i | 1 \leq i < j \leq r)$.

According to the definition of M, the value of the determinant is co-prime to M, and therefore co-prime to invertible mod M. Therefore, the matrix is also invertible. In other words, the values $N_1, \ldots, N_{r-1}$ and $K_j$ are recoverable, but only by someone who has a set of at least r secret shares $A_j$.

Enrollment and disenrollment are now described below.

The peer set V1, V2, . . . , Vr may be altered during a playback/use session or between playback/use sessions. Any device that suffers a malfunction or wishes to discontinue participation may be replaced by another device that has secret shares for the content as long as the security level r is preserved.

Any new device joining the network, and wishing to serve as a share holder, can be given a set of secret shares $A_j(z)$ corresponding to its index z. Depending on the trust model (trusted or non-trusted), the consuming device 12 or the content provider 20 (FIG. 1) preferably compute and provide the new secret shares for the new device z. Note that with the trusted model case, the consuming device 12 generally needs to gather r secret shares and restore the original CDIs 18 first (FIG. 1).

It is sensible to increase the security level r upon the enrollment of new devices. If the security level r is increased, all the participating devices must receive newly computed secret shares based on the new value of r.

Error recovery is now described below.

It is possible to strengthen the system against erroneous secret shares provided by cheating or malfunctioning participants. In order to detect bad secret shares, three subsets of r participants are used, instead of one subset. The subsets may overlap. In there are bad secret shares present, the sender of the bad secret shares may be detected by comparing the results from the three different subsets; the subsets where the sender of the bad secret shares does not participate will agree on the correct result. It may be necessary to change the participation of the subsets more than once to identify the sender of the bad secret shares.

It is appreciated that software components of the present invention may, if desired, be implemented in ROM (read only memory) form. The software components may, generally, be implemented in hardware, if desired, using conventional techniques.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A consuming device which is part of a network including other devices, the device comprising:
   computer processing machinery to:
   receive encrypted content and a plurality of doubly encrypted secret shares from a content provider, the doubly encrypted secret shares being received from the content provider doubly encrypted by an inner encryption and then an outer encryption such that the outer encryption needs to be decrypted before the inner encryption, the outer encryption being uniquely encrypted for decryption by a corresponding one of the other devices in the network, the inner encryption being for decryption only by the consuming device;
   distribute the doubly encrypted secret shares from the consuming device to the other devices, the consuming device being forced to distribute the secret shares to the other devices for decryption before the secrets can be used;
   a content storage medium to store the encrypted content therein, wherein the computer processing machinery is also operative to:
   receive, by the consuming device from the other devices, at least some of the secret shares with the outer decryption decrypted;
   decrypt the inner encryption of the received at least some secret shares;

form a content decryption input from the decrypted at least some secret shares;
receive the encrypted content from the content storage medium;
receive the content decryption input; and
decrypt the encrypted content using the content decryption input thereby rendering decrypted content; and
a content consumer to use the decrypted content.

2. The device according to claim 1, wherein the secret shares are formed in accordance with a threshold scheme such that only a predetermined number of any of the secret shares is needed in order to form the content decryption input, the predetermined number being greater than one but less than the number of the other devices.

3. The device according to claim 2, wherein the threshold scheme is based on the Shamir secret-sharing method.

4. The device according to claim 1, wherein:
the content consumer is a media player; and
the decrypted content includes a video frame.

5. The device according to claim 4, wherein the content decryption input is an entitlement control message.

6. The device according to claim 1, wherein:
the content consumer is a computer processor; and
the decrypted content includes at least part of a data file.

7. The device according to claim 6, wherein the content decryption input is a decryption key.

8. A method for restricting access to encrypted content stored in a consuming device which is part of a network including other devices, the method comprising the consuming device performing:

receiving encrypted content and a plurality of doubly encrypted secret shares from a content provider, the doubly encrypted secret shares being received from the content provider doubly encrypted by an inner encryption and then an outer encryption such that the outer encryption needs to be decrypted before the inner encryption, the outer encryption being uniquely encrypted for decryption by a corresponding one of the other devices in the network, the inner encryption being for decryption only by the consuming device;
distributing the doubly encrypted secret shares from the consuming device to the other devices, the consuming device being forced to distribute the secret shares to the other devices for decryption before the secrets can be used;
storing the encrypted content;
receiving, by the consuming device from the other devices, at least some of the secret shares with the outer decryption decrypted;
decrypting the inner encryption of the at least some secret shares;
forming a content decryption input from the decrypted at least some secret shares;
decrypting the encrypted content using the content decryption input thereby rendering decrypted content; and
using the decrypted content.

9. An apparatus including computer processing machinery to perform the steps of the method of claim 8.

* * * * *

UNITED STATES PATENT AND TRADEMARK OFFICE
CERTIFICATE OF CORRECTION

PATENT NO. : 8,842,835 B2  
APPLICATION NO. : 11/793365  
DATED : September 23, 2014  
INVENTOR(S) : Zeev Geyzel et al.

Page 1 of 1

It is certified that error appears in the above-identified patent and that said Letters Patent is hereby corrected as shown below:

Title page, item (73) Assignee: "Cisco Technology" should read --Cisco Technology, Inc.--

Signed and Sealed this  
Third Day of March, 2015

Michelle K. Lee  
*Deputy Director of the United States Patent and Trademark Office*